(12) United States Patent
Arnold et al.

(10) Patent No.: US 9,974,298 B2
(45) Date of Patent: May 22, 2018

(54) METHOD FOR PRODUCING A BIRD PROTECTION DEVICE AND BIRD PROTECTION DEVICE

(71) Applicants: BORAIDENT GmbH, Halle (DE); HUNSRUECKER GLASVEREDELUNG WAGENER GmbH & Co. KG, Kirchberg (DE)

(72) Inventors: Hans-Joachim Arnold, Remshalden (DE); Robert Bischoff, Halle (DE); Steffen Kuerbitz, Halle (DE); Andreas Luster, Seegebiet Mansfelder Land (DE); Thomas Rainer, Wernigerode (DE)

(73) Assignees: BORAIDENT GMBH, Halle (DE); HUNSRUECKER GLASVEREDELUNG WAGENER GMBH & CO. KG, Kirchberg (DE)

( * ) Notice: Subject to any disclaimer, the term of this patent is extended or adjusted under 35 U.S.C. 154(b) by 0 days. days.

(21) Appl. No.: 15/120,793

(22) PCT Filed: Feb. 19, 2015

(86) PCT No.: PCT/DE2015/000083
§ 371 (c)(1),
(2) Date: Aug. 23, 2016

(87) PCT Pub. No.: WO2015/127919
PCT Pub. Date: Sep. 3, 2015

(65) Prior Publication Data
US 2017/0020123 A1     Jan. 26, 2017

(30) Foreign Application Priority Data
Feb. 27, 2014 (DE) .......... 10 2014 002 644

(51) Int. Cl.
*A01M 29/08* (2011.01)
*A01M 29/06* (2011.01)
(Continued)

(52) U.S. Cl.
CPC ............ *A01M 29/08* (2013.01); *A01M 29/06* (2013.01); *B23K 26/0006* (2013.01);
(Continued)

(58) Field of Classification Search
CPC ...... A01M 29/00; A01M 29/06; A01M 29/08; B23K 26/082; B23K 26/08; B23K 26/361;
(Continued)

(56) References Cited

U.S. PATENT DOCUMENTS

2006/0070348 A1* 4/2006 Choate .................. B44F 1/066
52/786.11
2007/0044731 A1* 3/2007 Klem, Jr. .............. A01M 29/06
119/712

(Continued)

FOREIGN PATENT DOCUMENTS

DE     102007028543 A1     3/2008
EP         1110450 B1       3/2004
(Continued)

OTHER PUBLICATIONS

International Search Report of PCT/DE2015/000083, dated Jun. 17, 2015.
(Continued)

*Primary Examiner* — William R Alexander
(74) *Attorney, Agent, or Firm* — Cohen & Hildebrand, PLLC

(57) ABSTRACT

The invention relates to a method for producing a bird protection device and to a bird protection device. According to the invention, a method for producing a bird protection
(Continued)

device is proposed, wherein the bird protection device is made of an at least partially transparent material and contains an optical structure visible to a bird's eye. Here, the method comprises a radiation input, wherein the radiation input is implemented on and/or in the partially transparent material for forming the optical structure. The radiation input is preferably laser radiation. Suitable lasers for the radiation input are, for example, CO2 lasers with a wavelength of 1064 nm, picosecond lasers with a wavelength of 532 nm or nanosecond lasers with a wavelength of 532 nm. In one embodiment of the invention, the bird protection device furthermore comprises an element for increasing the contrast, wherein, for forming the optical structure, the radiation input is implemented on and/or in the element for increasing the contrast.

5 Claims, 2 Drawing Sheets

(51) Int. Cl.
| | | |
|---|---|---|
| | *C03C 21/00* | (2006.01) |
| | *C03C 23/00* | (2006.01) |
| | *B23K 26/00* | (2014.01) |
| | *B23K 26/082* | (2014.01) |
| | *B32B 17/10* | (2006.01) |
| | *B23K 26/53* | (2014.01) |
| | *G02B 5/18* | (2006.01) |
| | *B23K 26/361* | (2014.01) |
| | *A01M 29/00* | (2011.01) |
| | *B23K 103/16* | (2006.01) |
| | *B23K 103/00* | (2006.01) |

(52) U.S. Cl.
CPC ...... *B23K 26/0057* (2013.01); *B23K 26/0084* (2013.01); *B23K 26/082* (2015.10); *B23K 26/361* (2015.10); *B23K 26/53* (2015.10); *B32B 17/1022* (2013.01); *B32B 17/10036* (2013.01); *B32B 17/10266* (2013.01); *B32B 17/10761* (2013.01); *C03C 21/008* (2013.01); *C03C 23/0025* (2013.01); *G02B 5/1838* (2013.01); *A01M 29/00* (2013.01); *B23K 2203/166* (2015.10); *B23K 2203/50* (2015.10); *B23K 2203/54* (2015.10); *C03C 2218/328* (2013.01)

(58) Field of Classification Search
CPC .............. B23K 26/53; B32B 17/10036; B32B 17/10266; C03C 23/0025; G02B 5/1838
USPC .......................................................... 359/350
See application file for complete search history.

(56) References Cited

U.S. PATENT DOCUMENTS

| | | | | |
|---|---|---|---|---|
| 2007/0190343 | A1* | 8/2007 | Arkles | A01M 29/08 428/447 |
| 2009/0130349 | A1* | 5/2009 | Alvarez | C03C 17/36 428/34 |
| 2010/0098844 | A1* | 4/2010 | Pettinger | A01M 29/08 427/164 |
| 2010/0223861 | A1* | 9/2010 | Warwick | A01M 29/08 52/101 |
| 2012/0113519 | A1* | 5/2012 | Klem, Jr. | A01M 29/06 359/597 |
| 2013/0003208 | A1* | 1/2013 | Alsip | B44C 1/17 359/893 |
| 2013/0087720 | A1* | 4/2013 | Cesnik | A01M 29/08 250/461.1 |
| 2013/0323442 | A1* | 12/2013 | Krasnov | C03C 17/36 428/34 |
| 2014/0168760 | A1* | 6/2014 | Theios | C03C 17/3626 359/360 |
| 2015/0050505 | A1* | 2/2015 | Arkles | G02B 1/04 428/447 |
| 2015/0160385 | A1* | 6/2015 | Hicks | B32B 7/02 359/359 |
| 2015/0375485 | A1* | 12/2015 | Kuhlmann | A01M 29/08 428/203 |
| 2016/0041319 | A1* | 2/2016 | Hicks | G02B 5/223 359/359 |
| 2016/0137850 | A1* | 5/2016 | Ridealgh | A01M 29/08 428/195.1 |

FOREIGN PATENT DOCUMENTS

| | | |
|---|---|---|
| EP | 1479294 A2 | 11/2004 |
| EP | 1319335 B1 | 12/2006 |
| WO | 2004070148 A2 | 8/2004 |
| WO | 2013181033 A1 | 12/2013 |

OTHER PUBLICATIONS

Eckelt, Prospectus 4bird, www.eckelt.at, Eckelt Glas GmbH, 2010.
Website www.omilux.de, date captured as pdf. on Feb. 15, 2016 (2 pages) and Google English Translation thereof (2 pages).

* cited by examiner

METHOD FOR PRODUCING A BIRD PROTECTION DEVICE AND BIRD PROTECTION DEVICE

This is an application filed under 35 USC 371 of PCT/DE2015/000083 filed on Feb. 19, 2015 claiming priority to DE 10 2014 002 644.2 filed on Feb. 27, 2014, which is incorporated by reference.

BACKGROUND OF THE INVENTION

The invention relates to a method for producing a bird protection device according to the preambles of the independent claims and a bird protection device.

With the increasing use of glass in building shells, the number of bird strikes increases dramatically worldwide. Birds do not recognize the glass obstacles which appear to them as transparent and suffer serious injuries when flying against the glass facades. "Around 250,000 birds die every day in Europe due to impact on windows, glass doors and facades. Until recently, the solutions from the glass industry for the problem "bird strike" were totally inadequate. For example, the adhesively mounted silhouettes of birds of prey, which are still in use today, are completely ineffective as a "warning signal"."[www.ornilux.de].

Bird protection devices are known in the art which can be divided into two categories.

The first category includes devices that may be recognized by both birds and humans. Technical embodiments include for example glasses, which are provided with structures in the form of dots, lines or grids in the visible spectrum (380 nm to 780 nm) (WO 2004/070148 A2, Eckelt: Prospectus 4bird, www.eckelt.at).

The second category includes devices which are intended to protect birds from bird strikes and are, if possible, imperceptible by the human eye so as not to interfere with the aesthetics of the building. Here, the prior art focuses on the formation of structures in the ultraviolet region (UV-A=315 nm to 380 nm) which can be perceived by the bird's eye, but cannot be perceived by the human eye. For example, EP 1110450 B1 describes a bird protection device wherein the window pane is provided with a film that has higher absorptivity or reflectivity in the UVA wavelength range and is thus not visible to humans, but can be perceived by the bird. DE 102007028543 A1 describes different ways to form structures in the glass surface through incorporation of metal ions, which are visible for birds in the UV-A range but are invisible for humans. Furthermore, attempts have been made to design the bird protection structures by way of their dimensions so that they are hardly noticeable by humans. EP 1319335 B1 describes, for example, line-like structures with a main dimension than 0.5 mm, preferably smaller than 0.1 mm, which are therefore nearly imperceptible for humans.

While devices of the aforementioned type are known in the art, their implementation through process engineering solution has thus far only rarely been cited. For example, the description in DE 10 2007 028 543.6 discloses a multistep process wherein in the first step, a metal ion-containing paste is applied to the glass surface via a printing process; in the second step, the paste is dried for about 4 hours by heat treatment at about 70° C.; in the third step, diffusion of the metal ions into the glass surface is achieved by heat treatment of the entire glass body at about 500° C. for about 45 min; and subsequently in the fourth step, the excess paste is removed by a cleaning process. This example shows that the production of bird protection devices, in particular of those in the second category, has previously been attained in an unsatisfactory manner. The extensive, lengthy and complex producing process is costly and thus results in a bird protection device having high production costs. This inhibits the extensive application of such bird protection devices.

Accordingly, it is the object of the present invention to provide a lower-cost producing process for bird protection devices, which preferably also increases the contrast of the optical structures of the bird protection device.

BRIEF SUMMARY OF THE INVENTION

This object is achieved by a method for producing a bird protection device according to claim 1 and by a bird protection device according to claim 14. Advantageous embodiments are described in the dependent claims.

According to a first aspect of the invention, a method for producing a bird protection device is proposed, wherein the bird protection device is formed from an at least partially transparent material and includes an optical structure that is visible for a bird's eye. The method includes applying radiation, wherein for forming the optical structure, the radiation is applied to on and/or in the partially transparent material. Preferably, the applied radiation is a laser radiation. Suitable lasers for applying the radiation are for example $CO_2$ lasers having a wavelength of 1064 nm, picosecond laser having a wavelength of 532 nm or nanosecond lasers having a wavelength of 532 nm.

The term partially transparent material in the context of the present application refers to a material that allows at least partial transmission of electromagnetic radiation in the visible spectral range from 380 nm to 780 nm. Preferably, the material is transparent and allows complete transmission of light in the range from 380 nm to 780 nm.

In one embodiment of the invention, the bird protection device further includes an element for contrast enhancement, wherein for forming the optical structure, the radiation is applied on and/or in the element for contrast enhancement.

In a further embodiment of the invention, the optical structure is formed by employing laser radiation on and/or in the partially transparent material.

In a further embodiment of the invention, the optical properties in the interior of the partially transparent material are locally changed by the application of radiation in the optical structure. By focusing laser radiation into the partially transparent material, such as a glass body, optically scattering microcracks or absorbing color centers can be created. The focused laser radiation causes local heating of the glass, with the irradiated location as a result thermally expanding to then form the tensile crack (microcrack) or by causing, due to the power of the laser beam, a local change in the network structure of the glass to thereby lower the transmission of the glass (color center).

In a further embodiment of the invention, the optical structure is formed in the interior of the partially transparent material through laser-assisted, local formation of microcracks and/or formation of color centers.

In a further embodiment of the invention the optical structure is formed on the surface and/or inside the contrast enhancing element by laser-assisted, local change of the optical properties of the contrast-enhancing element.

In a further embodiment of the invention, the optical structure on the surface and/or inside the contrast-enhancing element is formed by laser-assisted, local formation of microcracks and/or formation of regions having a modified material density.

In a further embodiment of the invention, the optical structure is formed in the region proximate to the surface of the partially transparent material as surface-proximate layers containing metal atoms and/or metal nanoparticles, by laser-assisted diffusion of metal atoms from a source material that is in contact with the material. Laser transfer processes can be used to produce absorbing and/or reflecting and/or light-scattering structures on the glass surface or just below the glass surface in combination with laser assisted diffusion. In this case, carriers containing metal and/or color-pigments are brought into contact with the surface of the glass and metal atoms and/or color pigments are transferred from the carrier to the glass surface and fixed by way of laser irradiation. The optical structures formed in this way show, depending on the property of the transferred material, for example a changed absorptivity and/or reflectivity with respect to the glass.

In a further embodiment of the invention, the optical structure proximate to the surface of the partially transparent material is formed by laser-assisted diffusion of metal atoms selected from Ag, Cu, Au, Ti, Sn, from a source material that is in contact with the partially transparent material.

In a further embodiment of the invention, an optically effective structure of the partially transparent material is formed by locally printing with a laser transfer method.

In a further embodiment of the invention, layers having increased absorptivity and/or reflectivity with respect to the material are arranged on the surface of the partially transparent material which form an optically effective structure by laser-assisted partial removal of layers. The surface of the partially transparent material, for example glass, is provided with layers (e.g. full-surface screen printing) having increased absorptivity and/or reflectivity with respect to the glass. These layers can subsequently be evaporated by local, laser-assisted heating. This allows a partial removal of the layers from the glass surface, which forms an optically effective structure that can be recognized by the bird's eye.

In a further embodiment of the invention, an optical structure is formed on the surface of the material of the partially transparent material, wherein the partially transparent material is printed with metal-containing and/or color-pigment-containing layers, wherein a metal-containing and/or color-pigment-containing carrier is brought into contact with the surface of the partially transparent material and wherein metal atoms and/or color pigments are subsequently transferred by laser irradiation from the carrier to the material surface of the partially transparent material and fixed in place.

In a further embodiment of the invention, metal-containing and/or color pigment-containing layers are arranged on the partially transparent material, which are subsequently patterned by laser-assisted, partial removal and/or laser-assisted conversion so as to be optically effective.

According to a further aspect of the invention, a bird protection device is proposed, which is produced by the process according to the invention. The partially transparent material is hereby glass.

According to one embodiment of the invention, the contrast-enhancing element is made of a glass or plastic, which has at least in the UV-A wavelength range a greatly increased absorptivity and/or reflectivity and/or scattering power.

According to a further embodiment of the invention, the optical structure has an increased absorptivity and/or reflectivity compared to the partially transparent material and the contrast-enhancing element.

According to a further embodiment of the invention, the optical structure is formed as an optical grating, which scatters and/or diffracts UV-A radiation.

According to a further embodiment of the invention, the bird protection device is a laminated sheet glass or an insulating glass laminate.

It is also an object of the invention to use of an inventive method for producing a bird protection device according to the invention.

In contrast to the aforementioned prior art, the producing method according to the invention is based on a single-step process for producing the optical bird protection structure through the use of laser technology. Surprisingly, it has been found that structures which are also perceived by birds can be produced by applying laser radiation to glass. The study of the effect of laser-generated structures in and on glass surfaces with the test method of flight tunnels showed unexpected results. Depending on the type of laser structure, the effect on the flight behavior of birds ranged from attraction of birds to avoidance by birds. Basically, the following different types of laser-induced structures in or on the glass show an effect on the flight behavior of birds in the flight tunnel:

scattering microcracks or absorbing co for centers inside the glass, absorbing and/or reflecting structures on and/or slightly below the glass surface, absorbing and/or reflecting structures on a coated glass surface, and structures on/in the element for enhancing contrast.

By employing laser radiation and a suitable optical laser scanning technique, structures such as lines, dots or grids with almost any feature size (e.g., line width=100 μm to several mm) can be generated on the surfaces desired in the architectural glass (e.g. structured surface=10 m$^2$). Surprisingly, it turned out that the structural dimensions also significantly affects the flight behavior of birds in the flight tunnel, in that both attraction and avoidance behavior was observed.

In addition, it was found that a combination of glass with laser structure and a UV-A absorbing plastic caused an increased perception of the structures by the birds. Optical investigations have shown that the use of the UV-A-absorbing plastic results in a contrast enhancement of the optical structures in the UV-A wavelength range.

The method according to the invention thus provides a producing technology that advantageously allows a combination of the characteristics of the structure type, structure size and element for contrast enhancement so as to attain a high avoidance effect of the bird protection device.

A further advantage of the method is the fact that the bird protection structure is realized in a single producing step. The method offers the possibility to use as starting material semi-finished materials from architectural glass processing, such as glasses color-coated over the entire surface. These semi-finished materials are plentiful and have thus low material costs. This results significantly reduced production costs for the bird protection device compared to the prior art.

Additionally, the invention also provides a bird protection glass with a structure generated with laser radiation and an element for contrast enhancement of the structure. The bird protection glass produced with the method according to the invention is characterized by an increased effectiveness in preventing bird strikes in combination with low producing costs.

Preferred embodiments of the invention will be apparent from the combinations of the claims or individual features thereof.

BRIEF DESCRIPTION OF THE DRAWINGS

The invention will be described below with reference to several exemplary embodiments. The exemplary embodiments are intended to illustrate but not to limit the invention. The accompanying drawings show in FIG. 1 a schematic diagram of the application of radiation into a color layer arranged on the transparent material layer, in FIG. 2 a schematic diagram of the patterned color layer after application of the radiation, in FIG. 3 a schematic arrangement of a second glass and a PVB film on the patterned color layer for forming a composite glass, in FIG. 4 a schematic diagram of the composite glass obtainable with known protection device processes, and in FIG. 5: a schematic diagram of the effectiveness of the bird protection device according to the invention when a bird approaches.

DETAILED DESCRIPTION OF THE INVENTION

In a first exemplary embodiment, a variant of the producing process according the invention is shown schematically with reference to FIGS. 1 to 5.

Figure 1:
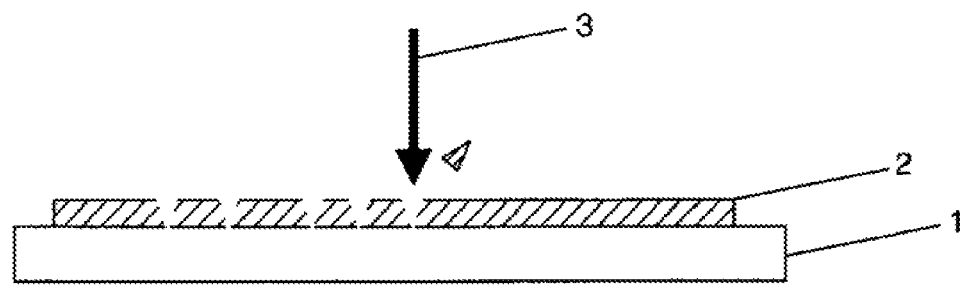
Figure 2:
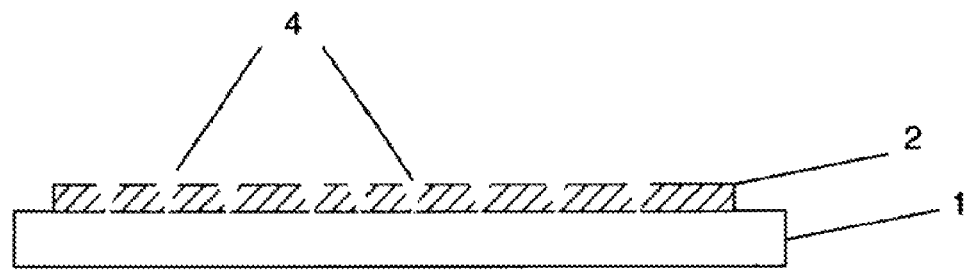

Initially, a color layer 2 is disposed on the surface of the partially transparent material 1, such as a glass sheet, for example by screen printing. Thereafter, radiation is applied with a laser beam 3, wherein a dot pattern 4 is patterned on the surface of the glass pane 1 by way of local heating of the color layer and the associated local evaporation of the color layer. For this purpose, the laser beam 3 is moved across the color layer 2 and the dwell time of the laser radiation on the layer is realized at selected irradiation locations, such that the color layer evaporates (FIG. 1).

Figure 3:
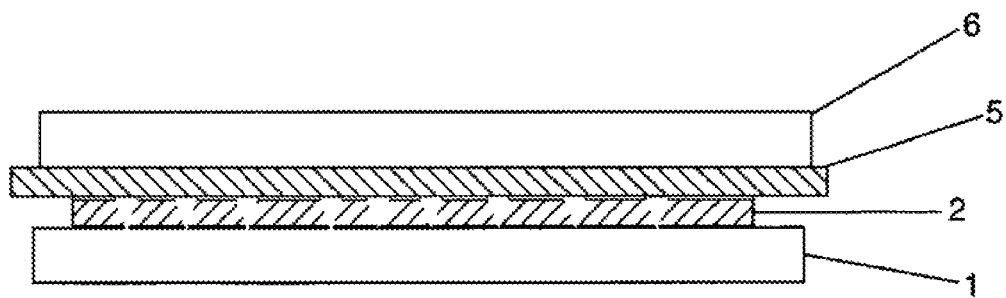
Figure 4:
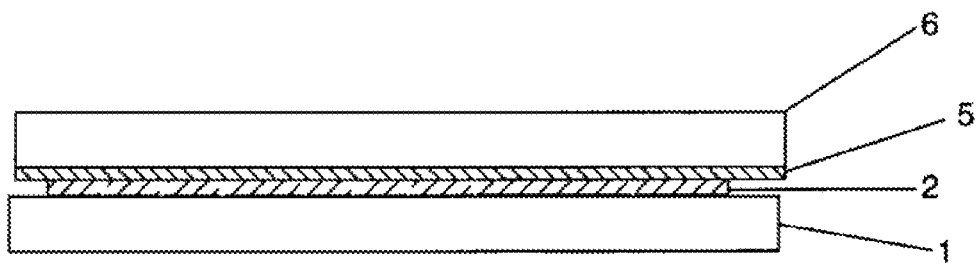

Subsequently, the thus-treated glass pane 1 is provided with a PVB film 5 (FIG. 2) and covered with a second glass 6 (FIG. 3). Polyvinyl butyral (PVB) is a plastic material, which is used mainly as a hot melt adhesive in the form of intermediate films for laminated safety glass. This composite is fixed in place with the prior art producing process for forming a glass laminate (laminated pane safety glass—VSG) (FIG. 4).

Figure 5:
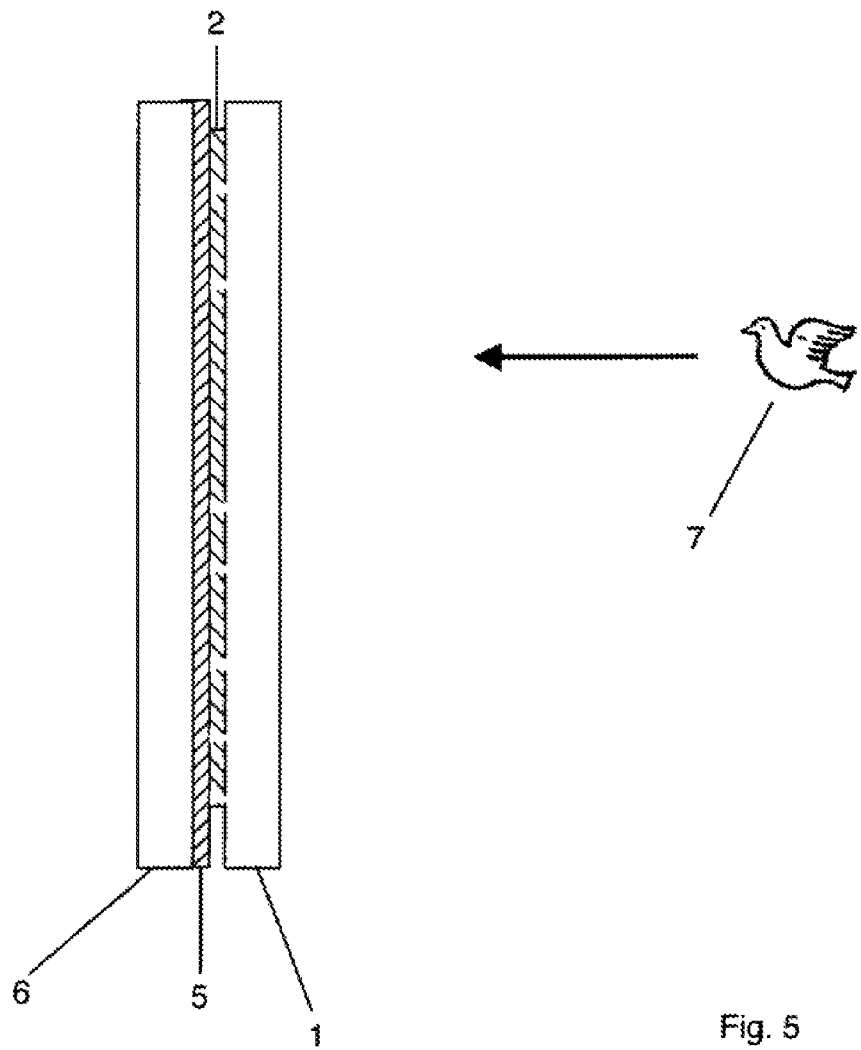

The bird protection glass pane is now installed in a building, so that the glass pane provided with the patterned color layer forms the outside of the building. The sunlight is then absorbed and/or reflected in the color layer and unimpededly transmitted in the structured areas into the building in the visible spectral range. The UV-A wavelength range of the solar radiation is absorbed in the PVB film. This creates a pattern that is visible for the bird's eye. The approaching bird 7 in flight recognizes this pattern and avoids the pane (FIG. 5).

In a further embodiment of the invention not illustrated in detail, the partially transparent material 1, for example a 4 mm thick float glass, is irradiated with a nanosecond laser 3 having a wavelength of 532 nm and an average laser power of 2 W and with a laser beam 3 focused into the interior of the glass 1 (focus diameter 40 µm). The laser beam 3 is hereby moved linearly in the interior of the glass, so that a parallel line structure is formed. The irradiation causes the formation of microcracks in the interior of the glass. The parallel lines composed of the microcracks have a thickness of 100 µm and a line spacing of 30 mm.

In a further embodiment of the invention not illustrated in detail, the partially transparent material 1, such as a 4 mm thick float glass, is irradiated with a picosecond laser 3 having a wavelength of 532 nm and a laser beam 3 focused into the interior of the glass (single pulse energies of 10 µJ). The laser beam 3 is hereby moved linearly in the interior of the glass, so that a parallel line structure is formed. The irradiation causes the formation of color centers (brown-colored glass regions) inside the glass 1. The parallel lines composed of the color centers have a thickness of 100 µm and a line spacing of 30 mm.

In a further embodiment of the invention not illustrated in detail, the partially transparent material 1, for example a 4 mm thick float glass, is coated with a silver ion-containing salt solution by an immersion process. After the layer has dried, the coated material is irradiated with a $CO_2$ laser having a wavelength of 1064 nm and with a laser beam focused on the coating (focus diameter 60 µm). The laser beam 3 is hereby moved linearly in the interior of the glass, so that a parallel line structure is formed. During the irradiation, the coating is locally heated and silver ions of the coating diffuse into the glass surface 1 and form after reduction of the ions to atoms nanoparticles in the glass interior 1. These silver nanoparticles color the glass 1 brown due to the physical effect of surface plasmon resonance. The parallel lines composed of the brown glass regions have a thickness of 100 µm and a line spacing of 30 mm.

In a further embodiment of the invention not illustrated in detail, the partially transparent material 1, for example a 4 mm thick float glass, is brought into contact with a coated plastic film 2 having a thickness of 150 µm. The coating of the film 2 is made of a ceramic, gray color. The film is irradiated with a nanosecond laser 3 having a wavelength of 1064 nm and an average laser power of 6 W with a laser beam 3 focused onto the film 2 (focus diameter 80 µm). The laser beam 3 is hereby moved linearly in the interior of the glass, so that a parallel line structure is formed. During the irradiation, the coating of the film 2 is transferred to the glass surface, thereby forming gray color stripes are on the glass surface. The parallel lines composed of the brown glass regions have a thickness of 100 µm and a line spacing of 30 mm.

In a further embodiment of the invention not illustrated in detail, the partially transparent material 1, for example a 4 mm thick float glass, is coated using a sputtering method with a commercially available heat-insulation layer, also referred to as a LowE-layer system. The layer is irradiated with a nanosecond laser having a wavelength of 1064 nm and a laser beam focused onto the coating 3 (focus diameter 50 µm). The laser beam 3 is hereby moved linearly in the interior of the glass, so that a parallel line structure is formed. The coating is locally removed during the irradiation by evaporation.

These regions from which the coating has been removed have a lower absorptivity and reflectivity in the ultraviolet region (UV-A) compared to the coated glass 1. The parallel lines composed of the glass regions from which the coating was removed have a thickness of 100 µm and a line spacing of 30 mm.

In a further embodiment of the invention not illustrated in detail, a laminated sheet safety glass composed of two float glasses 1 with a thickness of 4 mm, which are bonded together with a polyvinyl butyral film 5 (PVB), are irradiated with a nanosecond laser having a wavelength of 1064 nm and an average laser power of 2 W and with a laser beam 3 focused into the interior of the PVB film 5 (focus diameter 40 μm). The laser beam 3 is hereby moved linearly in the interior of the glass, so that a parallel line structure is formed. During irradiation, local changes in density (cavities) are formed inside the PVB film 5. The parallel lines composed of the cavities have a thickness of 100 μm and a line spacing of 30 mm.

LIST OF REFERENCE NUMERALS

1 partially transparent material
2 color layer
3 application of radiation
4 dot pattern
5 PVB film
6 second glass
7 bird

The invention claimed is:

1. A method for producing a bird protection device, comprising the steps of:
   forming the bird protection device of an at least partially transparent material, and providing an optical structure visible for a bird's eye, with a source of radiation, wherein the radiation is applied for forming the optical structure on the partially transparent material,
   wherein the optical structure of the partially transparent material is formed by locally printing with a laser transfer method.

2. A method for producing a bird protection device, comprising the steps of:
   forming the bird protection device of an at least partially transparent material, and providing an optical structure visible for a bird's eye, with a source of radiation, wherein the radiation is applied for forming the optical structure on the partially transparent material,
   wherein layers forming the optical structure having increased absorptivity and/or reflectivity with respect to the partially transparent material are arranged on a surface of the partially transparent material, wherein the optical structure is formed through laser-assisted, partial removal of the layers.

3. A method for producing a bird protection device, comprising the steps of:
   forming the bird protection device of an at least partially transparent material, and providing an optical structure visible for a bird's eye, with a source of radiation, wherein the radiation is applied for forming the optical structure on and/or in the partially transparent material,
   herein for forming the optical structure the radiation is applied on and/or in an element for contrast enhancement,
   wherein the optical structure on a surface and/or in an interior of the element for contrast enhancement is formed by laser-assisted, local change of optical properties of the element for contrast enhancement.

4. A method for producing a bird protection device, comprising the steps of:
   forming the bird protection device of an at least partially transparent material, and providing an optical structure visible for a bird's eye, with a source of radiation, wherein the radiation is applied for forming optical structure on and/or in the partially transparent material,
   herein for forming optical structure the radiation is applied on and/or in an element for contrast enhancement,
   wherein the optical structure on a surface and/or in an interior of the element for contrast enhancement is formed by laser-assisted, local formation of microcracks and/or by formation of regions of changed material density.

5. A bird protection device comprising:
   an at least partially transparent material, comprising an optical structure visible for a bird's eye, with a source of radiation, wherein the radiation is applied for forming the optical structure in the partially transparent material and wherein the partially transparent material is glass,
   wherein the optical structure is formed as an optical grating, which scatters and/or diffracts UV-A radiation.

* * * * *